(12) United States Patent
Harayama et al.

(10) Patent No.: US 10,014,515 B2
(45) Date of Patent: Jul. 3, 2018

(54) BATTERY

(75) Inventors: Takashi Harayama, Toyota (JP);
Kazuyuki Kusama, Nagoya (JP);
Hiroyuki Nakayama, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 202 days.

(21) Appl. No.: 14/344,627

(22) PCT Filed: Sep. 27, 2011

(86) PCT No.: PCT/JP2011/072012
§ 371 (c)(1),
(2), (4) Date: Mar. 13, 2014

(87) PCT Pub. No.: WO2013/046322
PCT Pub. Date: Apr. 4, 2013

(65) Prior Publication Data
US 2015/0325833 A1    Nov. 12, 2015

(51) Int. Cl.
*H01M 2/36* (2006.01)
*H01M 2/04* (2006.01)
*H01M 2/08* (2006.01)

(52) U.S. Cl.
CPC .......... *H01M 2/365* (2013.01); *H01M 2/043* (2013.01); *H01M 2/0439* (2013.01); *H01M 2/08* (2013.01)

(58) Field of Classification Search
CPC .................................................. H01M 2/365
See application file for complete search history.

(56) References Cited

U.S. PATENT DOCUMENTS

| 3,427,205 A | 2/1969 | Plitt et al. |
| 4,707,424 A | 11/1987 | Bowsky et al. |
| 6,080,290 A * | 6/2000 | Stuart ............ C25B 9/20 204/255 |
| 6,171,374 B1 * | 1/2001 | Barton ............ B01D 63/081 210/321.75 |

(Continued)

FOREIGN PATENT DOCUMENTS

| DE | 37 83 853 T2 | 5/1993 | |
| JP | 59-44027 * | 3/1984 | ............ H01G 1/02 |

(Continued)

OTHER PUBLICATIONS

JP59-44027translation.*

*Primary Examiner* — Sarah A. Slifka
*Assistant Examiner* — Brian R Ohara
(74) *Attorney, Agent, or Firm* — Finnegan, Henderson, Farabow, Garrett & Dunner LLP (57) ABSTRACT

A battery includes: a battery case having a case body member and a case lid member having a through hole; a rivet that engages with the through hole; and a gasket. The through hole is hermetically sealed with the gasket interposed between the circumferential outer surface of the case lid member and an outer flange of the rivet. The case lid member is configured such that, in a state wherein a peripheral edge portion connected to an opening end portion of the case body member, the circumferential outer surface is positioned in the axial outward direction such that the circumferential outer surface faces further towards the outer side along the axis line of the through hole than the peripheral edge portion and the opening end portion.

5 Claims, 8 Drawing Sheets

(56) References Cited

U.S. PATENT DOCUMENTS

| | | | | |
|---|---|---|---|---|
| 2003/0098550 A1* | 5/2003 | Groh | ................ | F16J 15/061 |
| | | | | 277/630 |
| 2010/0304214 A1 | 12/2010 | Itoh et al. | | |
| 2011/0072648 A1 | 3/2011 | Yamauchi | | |
| 2011/0269014 A1* | 11/2011 | Okimoto | ............ | H01M 2/0404 |
| | | | | 429/179 |

FOREIGN PATENT DOCUMENTS

| | | |
|---|---|---|
| JP | 2003-229118 | 8/2003 |
| JP | 2010-277936 | 12/2010 |
| JP | 2013-20729 | 1/2013 |

\* cited by examiner

BATTERY

CROSS-REFERENCE TO RELATED APPLICATIONS

This application is a national phase application of International Application No. PCT/JP2011/072012, filed Sep. 27, 2011, the content of which is incorporated herein by reference.

TECHNICAL FIELD

The present invention relates to a battery provided with a battery case having a through hole and configured such that the through hole of the battery case is hermetically sealed by use of a rivet and a gasket.

BACKGROUND ART

Heretofore, there is known a battery provided with a battery case formed with a through hole such as a liquid injection port for injection of an electrolyte, this through hole of the battery case being hermetically sealed. Accordingly, batteries using various sealing structures to seal such a through hole have been proposed. For instance, Patent Document 1 discloses a sealed battery configured such that a seal material is interposed between an engagement flange of a sealing member and a circumferential outer surface of a liquid injection port (a through hole), in which a blind rivet is used as the sealing member.

RELATED ART DOCUMENTS

Patent Documents

Patent Document 1: JP-A-2003-229118

SUMMARY OF INVENTION

Problems to be Solved by the Invention

However, in the sealed battery disclosed in Patent Document 1, a lid member of the battery case has a stepped cup-like shape having a shoulder formed and a large-diameter joining cylindrical part around a bottom. The bottom formed with the liquid injection port is designed to be lower than its surrounding part. Thus, the condition of the seal material held between an engagement flange of the blind rivet and the outer surface around the liquid injection port could not be appropriately observed from outside of the battery case (in a lateral direction). Even if the shape of the lid member of the battery case is flat, when the opening of the case body is closed by the lid member by welding or the like, joining portions of the case body and the lid member are bulged and thus the condition of the seal material still could not be easily appropriately observed from outside of the battery case (in the lateral direction). This results in a problem that even when the blind rivet is insufficiently or excessively pressed, this condition could not be judged from outside of the battery case.

The present invention has been made in view of the circumstances and has a purpose to provide a battery enabling ascertaining a condition of a gasket that seals a through hole of a battery case from outside of the battery case.

Means of Solving the Problems

To achieve the above purpose, one aspect of the invention provides a battery including: a battery case having: a case body member including an opening and an opening end portion defining this opening; and a case lid member having a through hole formed through the case lid member and a peripheral edge portion joined to the opening end portion of the case body member to seal the opening; a rivet engaged in the through hole, the rivet including: a shaft portion inserted in the through hole; and an outer flange continuous to the shaft portion on outside of the battery case, the outer flange being larger in diameter than the shaft portion; and a gasket made in an annular form and of thermoplastic resin or rubber elastic material, the gasket being interposed between and in close contact with a circumferential outer surface of an outer surface of the case lid member facing to the outside of the battery case, the circumferential outer surface being located around a peripheral edge of the through hole, and the outer flange of the rivet to hermetically seal the through hole, wherein the case lid member is configured such that the circumferential outer surface is positioned more outward in an axial outward direction facing outside along an axis line of the through hole than the peripheral edge portion and the opening end portion while the peripheral edge portion of the case lid member is joined to the opening end portion of the case body member.

This battery has the through hole in the case lid member, and the gasket interposed in close contact with and between the circumferential outer surface of the outer surface of the case lid member facing outside of the battery case, located around the peripheral edge of the through hole, and the outer flange of the rivet engaged in the through hole to hermetically seal the through hole. In this battery, the case lid member is configured such that the circumferential outer surface is positioned more outward in the axial outward direction than the peripheral edge portion of the case lid member and the opening end portion of the case body member while the peripheral edge portion of the case lid member is joined to the opening end portion of the case body member.

The thus configured battery enables grasping a condition of the gasket that seals the through hole from the outside of the battery case without being interrupted by the peripheral edge portion of the case lid member and the opening end portion of the case body member.

It is to be noted that the rivet used for sealing also includes the blind rivet disclosed in Patent Document 1. The material of the gasket may include thermoplastic resin such as PFA (tetrafluoroethylene perfluoroalkylvinylether copolymer) and rubber elastic material such as EPDM (ethylene propylene diene rubber).

Furthermore, in the aforementioned battery, it is preferable that assuming that a first position is a position at which an outer-surface-side edge which is an edge contacting with the circumferential outer surface of an outer peripheral surface of the gasket interposed between the circumferential outer surface and the outer flange is visually identifiable when the battery case is observed from a radial outside of the axis line more than the battery case toward a radial inside of the axis line, and assuming that a second position is a position at which an outer-flange-side edge which is an edge contacting with the outer flange of the outer peripheral surface of the gasket interposed between the circumferential outer surface and the outer flange is visually identifiable when the battery case is observed from a position on the radial outside of the axis line more than the battery case and at the same angle position in a circumferential direction of the axis line as the first position and more outward in the axial outward direction than the first position toward the radial inside of the axis line, the case body member and the case lid member of the battery case and the outer flange of the rivet are configured such that the first position and the second position are present.

In this battery, the case body member and the case lid member of the battery case and the outer flange of the rivet are configured such that the outer-surface-side edge of the gasket can be visually identified when the battery case is observed from the first position located on the radial outside of the axis line more than the battery case toward the radial inside of the axis line. Furthermore, they are configured such that the outer-flange-side edge of the gasket can be visually identified when the battery case is observed from the second position located on the radial outside of the axis line more than the battery case and at the same angle position as the first position in the circumferential direction of the axis line and more outward in the axial outward direction than the first position.

The thus configured battery enables appropriately detecting the positions of the outer-flange-side edge and the outer-surface-side edge in the axial direction or the positional relationship between them from the outside of the battery case without being influenced for example by the presence of the opening end portion of the case body member and a raised or bulged melted portion in joining portions of the case body member and the case lid member. Accordingly, the thickness of the gasket interposed between the circumferential outer surface of the case lid member and the outer flange of the rivet, that is, a compressed state of the gasket can be easily identified. Thus, the battery enabling easily checking the adequacy of sealing using the rivet and the gasket can be obtained.

Furthermore, the case body member and the case lid member enabling visual identification of the outer-surface-side edge from the first position and the outer-flange-side edge from the second position are configured for example such that the position of a portion positioned more outside than the circumferential outer surface, the portion including the peripheral edge portion of the case lid member, and the position of the opening end portion of the case body member in the axial direction are set in an opposite direction (an axial inward direction) to the axial outward direction than the circumferential outer surface in at least any angle position in the circumferential direction of the axis line of the through hole. Furthermore, in addition to the above, it is configured such that other members such as a terminal member are not installed in a middle portion of the case lid member located between the circumferential outer surface and the peripheral edge portion at the angle position in the above circumferential direction or it is configured such that, even if installed, the positions of the other members in the axial direction are positioned more inward in the axial direction than the circumferential outer surface of the case lid member.

For example, the outer flange of the rivet may be configured such that the outer flange is formed with the same diameter as the outer-flange-side edge of the gasket over its entire circumference. As an alternative, the outer flange of the rivet may be configured to include a portion located on the radial outside more than the outer-flange-side edge of the gasket over the entire or partial circumference, but this portion is located more outward in the axial outward direction than the outer-flange-side edge in any of the circumferential direction.

Furthermore, in the above battery, preferably, the circumferential outer surface of the case lid member is a flat surface perpendicular to the axis line, a flange internal surface of the outer flange of the rivet facing the circumferential outer surface includes a contact portion contacting with the gasket, and at least the contact portion of the flange internal surface is a flat surface perpendicular to the axis line.

Still further, in the above battery, preferably, the outer flange of the rivet is configured to include a portion on a radial outside more than the outer-flange-side edge of the gasket so that the portion is positioned more outward in the axial outward direction than the outer-flange-side edge over an entire circumference.

MODE FOR CARRYING OUT THE INVENTION

First Embodiment

Figure 1:
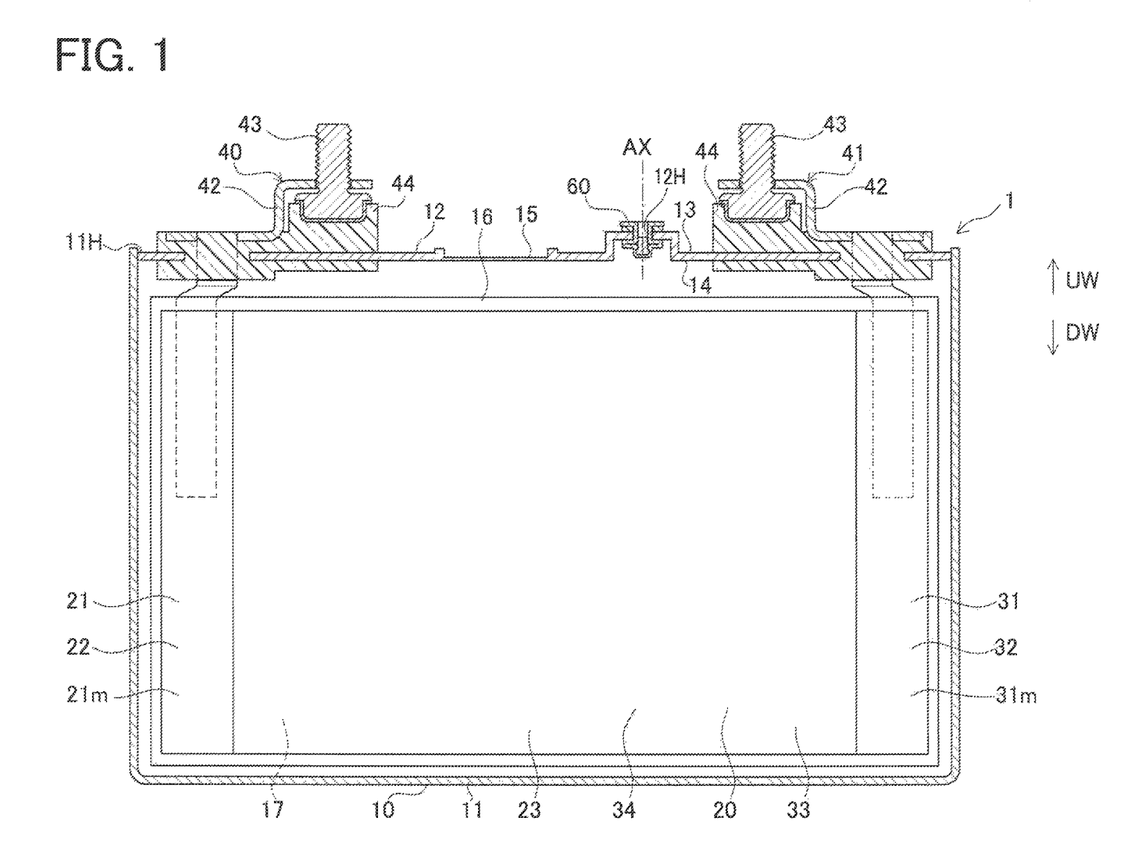
FIG. 1 is a vertical cross sectional view of a lithium ion secondary battery in a first embodiment.
Figure 2:
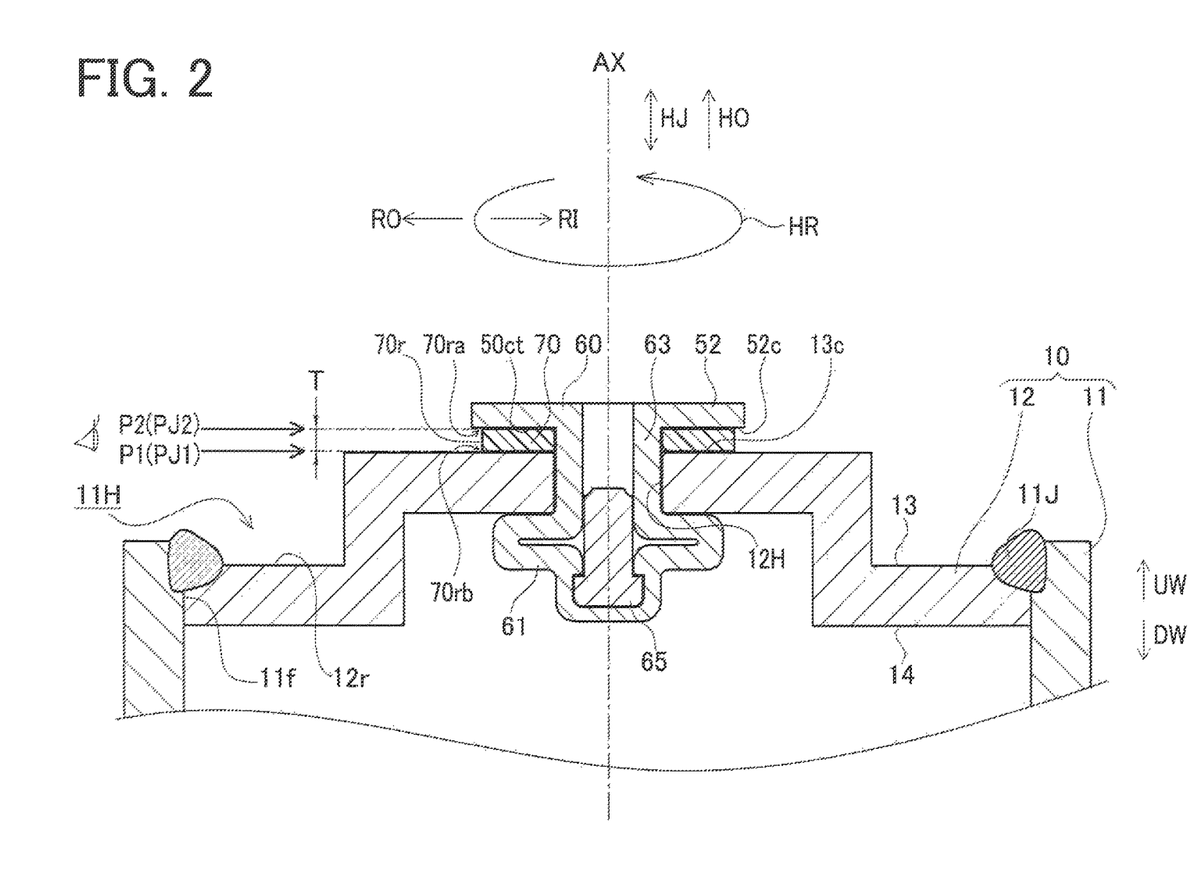
FIG. 2 is a vertical cross sectional view of a sealing structure of a through hole seen in a direction rotated 90° from FIG. 1 about an axis line of the through hole.
Figure 3:
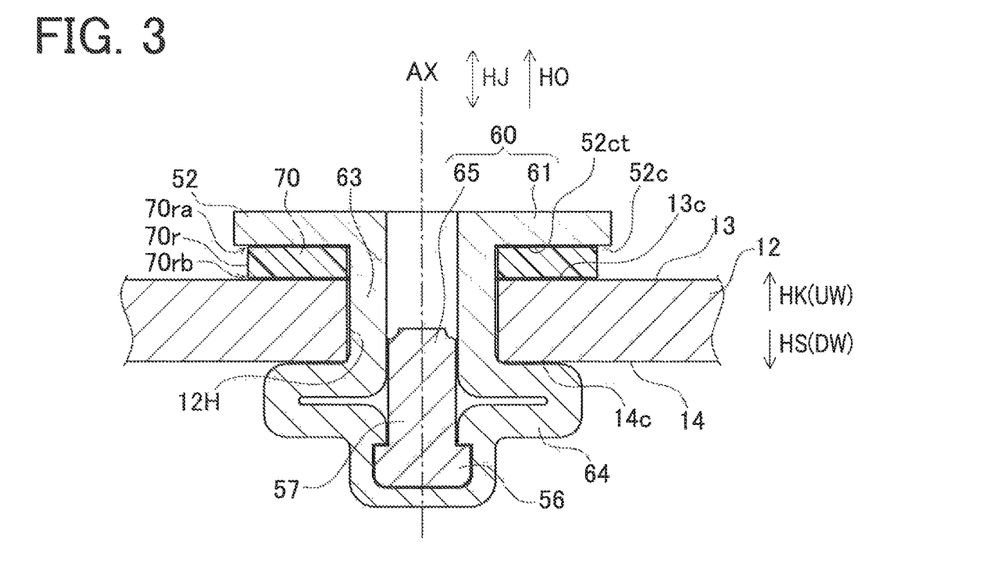
FIG. 3 is a vertical cross sectional view showing the details of the sealing structure of the through hole sealed by a deformed blind rivet in the first embodiment.

A detailed description of a preferred embodiment of the present invention will now be given referring to the accompanying drawings. FIG. 1 is a vertical cross sectional view of a lithium ion secondary battery (a sealed battery) 1 (hereinafter, also simply referred to as a battery 1) in a first embodiment. FIG. 2 is a vertical cross sectional view showing a sealing structure of a through hole 12H seen in a direction rotated 90° from FIG. 1 about an axis line AX of the through hole 12H. FIG. 3 shows the details of the sealing structure of the through hole 12H sealed by a deformed blind rivet 60. In the present description, the upper side in FIGS. 1, 2, and 3 is assumed as an upper side UW of the battery 1 and the lower side is assumed as a lower side DW of the battery 1. In FIG. 2, when a direction to see a battery case 10 from inside to outside in an axial direction along the axis line AX of the through hole 12H is assumed as an axial outward direction HO, the axial outward direction HO is the same direction as the upper side UW of the battery 1 in the first embodiment.

This battery 1 is a rectangular battery to be mounted in a vehicle such as a hybrid car and an electric car or in a battery-mounting device such as a hammer drill. This battery 1 includes a rectangular parallelepiped battery case 10, a wound electrode body 20 accommodated in this battery case 10, a positive terminal 40 and a negative terminal 41 supported in the battery case 10, and others (see FIG. 1). In the battery case 10, further, a non-aqueous type electrolyte 17 is stored.

The battery case 10 is made of metal (aluminum in the first embodiment). This battery case 10 consists of a case body member 11 having a rectangular parallelepiped box-like shape with a closed bottom, opening only at the upper side UW, and a case lid member 12 welded to this case body member 11 to close an opening 11H of the case body member 11. The case body member 11 includes an opening end portion 11f defining the opening 11H. The opening 11H is closed in such a manner that a peripheral edge portion 12r of the case lid member 12 is welded to the opening end portion 11f of the case body member 11 through a joining (weld) portion 11J (see FIG. 2). The case lid member 12 includes an outer surface 13 facing to the outside of the battery case 10 and an inner surface 14 facing to the inside of the battery case 10.

The case lid member 12 is provided with a safety valve 15 which will be broken when the internal pressure of the battery case 10 reaches a predetermined pressure. Further, this case lid member 12 is formed therethrough with a through hole 12H (a liquid injection port). This case lid member 12 is hermetically sealed by a deformed blind rivet 60 and a gasket 70 as will be mentioned later. Assuming that a portion of the outer surface 13 of the case lid member 12, located around the peripheral edge of the through hole 12H, is referred to as a circumferential outer surface 13c, the case lid member 12 is configured such that the circumferential outer surface 13c is positioned more outward in the axial outward direction HO than a peripheral edge portion 12r of the case lid member 12 and the opening end portion 11f while the peripheral edge portion 12r is joined to the opening end portion 11f of the case body member 11 (see FIG. 2). In the first embodiment, specifically, the circumferential outer surface 13c formed with the through hole 12H protrudes in a circular cylindrical shape upward from the peripheral edge portion 12r of the case lid member 12 toward the axial outward direction HO (the upper side UW of the battery 1).

To the case lid member 12, the positive terminal 40 and the negative terminal 41 each including an extended terminal member 42 and a bolt 43 are fixed through insulating members 44 made of resin (see FIG. 1). In the battery case 10, the positive terminal 40 is connected to a positive electrode sheet 21 (its positive current collecting portion 21m) of the electrode body 20, while the negative terminal 41 is connected to a negative electrode sheet 31 (its negative current collecting portion 31m) of the electrode body 20.

Next, the electrode body 20 will be explained. This electrode body 20 is packed in an insulating film envelope 16 formed of an insulating film in a bag shape opening only at the upper side UW, and this packed electrode body 20 is accommodated sideways in the battery case 10. This electrode body 20 is formed of a strip-shaped positive electrode sheet 21 and a strip-shaped negative electrode sheet 31 that are wound in laminated relation one on the other by interposing strip-shaped separators 34 and compressed into a flattened shape.

The positive electrode sheet 21 includes a positive current collecting foil 22 made of a strip-shaped aluminum foil as a core member. Main surfaces of this positive current collecting foil 22 are provided with strip-shaped positive active material layers 23 on regions being located partially in a width direction and extending in a longitudinal direction of the foil 22. Each of the positive active material layers 23 is made of positive active material, conductive material, and binding material. Of the positive current collecting foil 22, an end portion on one side in the width direction forms the positive current collecting portion 21m in which the positive active material layers 23 do not exist in the direction of thickness of the foil 22. This positive current collecting portion 21m is connected to the positive terminal 40 mentioned above.

The negative electrode sheet 31 includes a negative current collecting foil 32 made of a copper foil in a strip shape as a core member. Main surfaces of this negative current collecting foil 32 are provided with strip-shaped negative active material layers 33 on regions being located partially in a width direction and extending in a longitudinal direction of the foil 32. Each of the negative active material layers 33 is made of negative active material, conductive material, and binding material. Of the negative current collecting foil 32, an end portion on one side in the width direction forms the negative current collecting portion 31m in which the negative active material layers 33 do not exist in the direction of thickness of the foil 32. This negative current collecting portion 31m is connected to the negative terminal 41 mentioned above.

Further, the separators 34 are porous films made of resin, specifically, polypropylene (PP) and polyethylene (PE) and formed in a strip shape.

The sealing structure of the through hole 12H (the liquid injection port) will be explained below. As described above, the case lid member 12 is formed therethrough with the through hole 12H (the liquid injection port). This through hole 12H is hermetically sealed by the deformed blind rivet 60 (hereinafter, also simply referred to as a rivet 60) and the gasket 70. The deformed blind rivet 60 includes a deformed rivet body 61 having nearly a bottom-closed cylindrical shape and a broken or fractured shaft part 65 (a large-diameter portion 56 and a core rod portion 57 of an undeformed blind rivet 50 which will be mentioned later) having an inverted T shape in cross section surrounded by the deformed rivet body 61 (see FIG. 3). The deformed rivet body 61 has a shaft portion 63, an outer flange 52, and a deformed caulking portion 64. Of the deformed rivet body 61, the shaft portion 63 has a cylindrical shape and is inserted in the through hole 12H. Herein, relating to the deformed blind rivet 60, the deformed rivet body 61, the undeformed blind rivet 50 and an undeformed rivet body 51 mentioned later, the direction from the outer flange 52 toward the shaft portion 63 is referred as a distal end side HS and the opposite direction is referred to as a proximal end side HK (the same applies to subsequent figures). The outer flange 52 of the deformed rivet body 61 is continuous to the proximal end side HK (the upper side UW of the battery 1, the axial outward direction HO in the FIG. 3) of the shaft portion 63 and is larger in diameter than the shaft portion 63 to caulk the circumferential outer surface 13c through the gasket 70. The circumferential outer surface 13c corresponds to the peripheral edge of the through hole 12H of the outer surface 13 of the case lid member 12. The deformed caulking portion 64 is continuous to the distal end side HS of the shaft portion 63 and is larger in diameter than the shaft portion 63 to caulk a circumferential inner surface 14c which corresponds to the peripheral edge of the through hole 12H of the inner surface 14 of the case lid member 12. The gasket 70 made of thermoplastic resin (to be concrete, PFA) in an annular form and placed between and in close contact with the circumferential outer surface 13c of the case lid member 12 and the outer flange 52 of the rivet 60 (the deformed rivet body 61). Thus, the through hole 12H of the battery case 10 is hermetically sealed by the rivet 60 and the gasket 70. The deformed blind rivet 60 is provided to close the through hole 12H by partially deforming the undeformed blind rivet 50 mentioned later. The gasket 70 may also be made of rubber-like elastic material (to be concrete, EPDM).

Assume that, in a state where the gasket 70 is interposed between the circumferential outer surface 13c and the outer flange 52 of the rivet 60, one edge of an outer peripheral surface 70r of the gasket 70 located to contact with the outer flange 52 is referred to as an outer-flange-side edge 70ra and the other edge located to contact with the circumferential outer surface 13c is referred to as an outer-surface-side edge 70rb. When the battery 1 is seen from at least any one position on the radial outside RO of the axis line AX of the through hole 12H more than the battery case 10 and in the circumferential direction HR of the axis line AX (e.g., from a right and left direction in FIG. 2 in the first embodiment) toward the radial inside RI of the axis line AX, the outer-surface-side edge 70rb can be visually identified as shown in FIGS. 2 and 3.

Furthermore, assuming that the above position on the radial outside RO of the axis line AX in which the outer-surface-side edge 70rb can be visually identified is referred to as a first position P1 (e.g., the left direction of the right and left direction in FIG. 2 in the first embodiment), when the battery 1 is seen from a second position P2 toward the radial inside RI of the axis line AX, the second position P2 being positioned on the radial outside RO of the axis line AX of the through hole 12H more than the battery case 10 and at the same angle position in the circumferential direction HR of the axis line AX as the first position P1 (e.g., the left direction in FIG. 2 in the first embodiment) but more outward in the axial outward direction HO than the first position P1, the outer-flange-side edge 70ra can also be visually recognized. Specifically, the case body member 11 and the case lid member 12 of the battery case 10 and the outer flange 52 of the rivet 60 are configured so that the outer-surface-side edge 70rb and the outer-flange-side edge 70ra are visible from the radial outside RO of the axis line AX as mentioned above.

The circumferential outer surface 13c of the case lid member 12 is a flat face perpendicular to the axis line AX of the through hole 12H. The outer flange 52 of the rivet 60 has a portion located on the radial outside RO more than the outer-flange-side edge 70ra of the gasket 70. However, the flange internal surface 52c (including a contact portion 52ct contacting with the gasket 70) of the outer flange 52 of the rivet 60 facing the circumferential outer surface 13c is an entirely flat face perpendicular to the axis line AX.

A method for producing the battery 1 in the first embodiment will be explained below. The strip-shaped positive electrode sheet 21 and the strip-shaped negative electrode sheet 31, which are separately produced, are laminated one on the other by interposing the strip-shaped separators 34 one each between them and are wound together around a winding core. Thereafter, this wound assembly is compressed into a flattened shape, to produce the electrode body 20.

The case lid member 12 formed with the safety valve 15, the through hole 12H, and others, and the extended members 42 and the bolts 43 are separately prepared. The insulating members 44 are made by injection molding, whereby the positive terminal 40 and the negative terminal 41 are fixed to the case lid member 12.

Successively, the positive terminal 40 is connected (welded) to the positive current collecting portion 21m of the electrode body 20. The negative terminal 41 is connected (welded) to the negative current collecting portion 31m of the electrode body 20. Thereafter, the electrode body 20 is accommodated through the insulating film envelope 16 into the case body member 11 and then the opening 11H of the case body member 11 is closed by the case lid member 12. The case body member 11 and the case lid member 12 are welded by laser welding, completing the battery case 10 (see FIG. 1).

Subsequently, the above battery is put in a vacuum chamber, and the inside of this vacuum chamber is decompressed. Under a reduced pressure, a liquid injection nozzle is inserted in the through hole 12H and the electrolyte 17 is injected into the battery case 10 through the nozzle.

Figure 4:
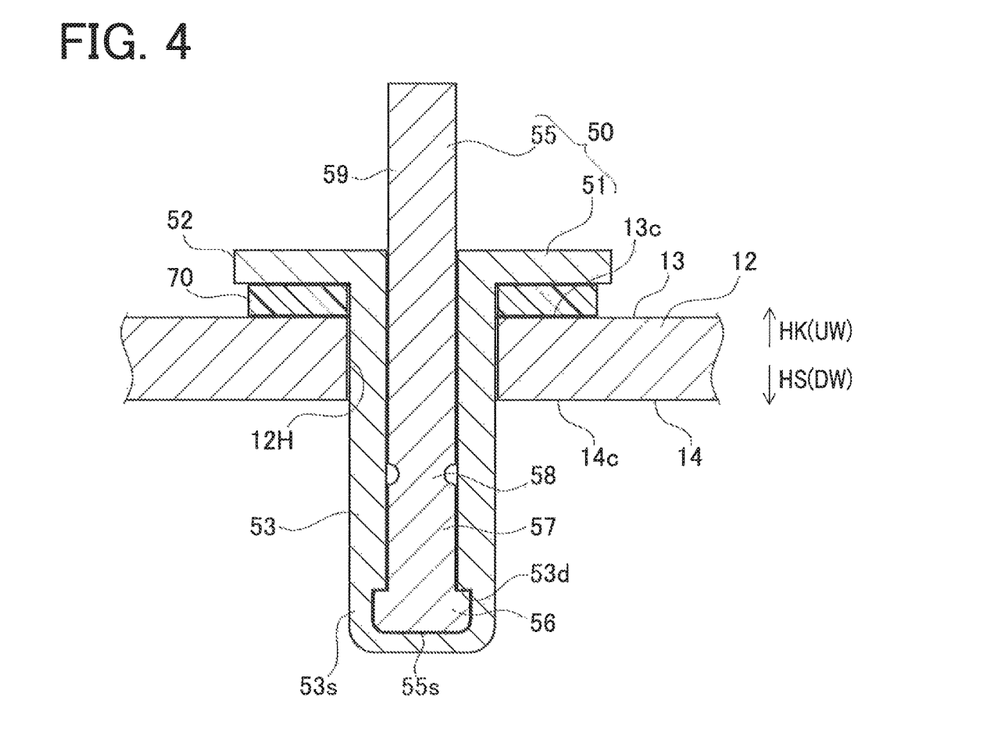
FIG. 4 is a vertical cross sectional view showing a state where an undeformed blind rivet is inserted in the through hole in the first embodiment.
Figure 5:
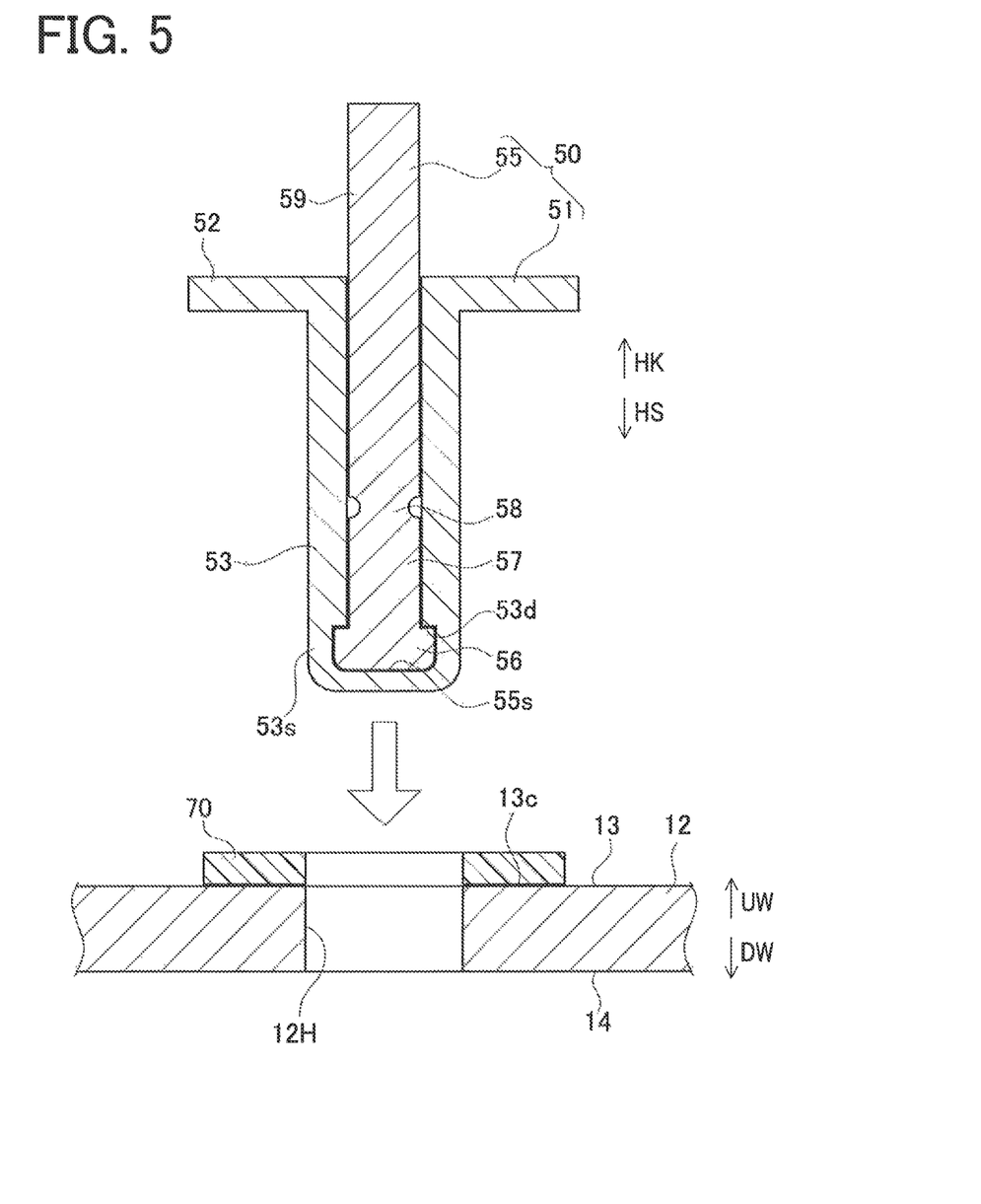
FIG. 5 is a vertical cross sectional view showing a state where the undeformed blind rivet is not yet inserted in the through hole in the first embodiment.

Furthermore, under a reduced pressure, the through hole 12H is sealed by use of the undeformed blind rivet 50. The structure of the undeformed blind rivet 50 to be used in the first embodiment will be explained below first. The undeformed blind rivet 50 includes, as shown in FIGS. 4 and 5, the undeformed rivet body 51 having a cylindrical shape with a closed bottom on the distal end side HS (a lower side in FIGS. 4 and 5) and a rod-like shaft (undeformed) part 55 placed in this undeformed rivet body 51. The undeformed rivet body 51 made of aluminum has a cylindrical shape with a closed bottom on the distal end side HS including a cylindrical portion 53 to be inserted in the through hole 12H and an annular outer flange 52 continuous to this cylindrical portion 53 on the proximal end side HK (an upper side in FIGS. 4 and 5), the outer flange 52 being larger in diameter than the cylindrical portion 53 and engageable with the outer surface 13 of the battery case 10. Of the cylindrical portion 53, a cylindrical leading end portion 53s on the distal end side HS is formed with an internal diameter larger (i.e., with a wall thickness thinner) than a portion on the proximal end side HK. Accordingly, the cylindrical portion 53 is internally formed with a shoulder 53d by a change in wall thickness.

On the other hand, the undeformed shaft part 55 is made of stainless steel and has a shaft leading end portion 55s on the distal end side HS (the lower side in FIGS. 4 and 5) placed in the cylindrical portion 53 of the undeformed rivet body 51. A tip portion of this shaft leading end portion 55s has a large-diameter portion 56 formed with a large diameter engageable with the shoulder 53d of the cylindrical leading end portion 53s of the cylindrical portion 53. This shaft part 55 includes, in addition to the large-diameter portion 56, a core rod portion 57, a to-be-broken portion 58, and an operating rod portion 59, which are arranged in the order from the large-diameter portion 56 toward the proximal end side HK (the upper side in FIGS. 4 and 5). The core rod portion 57 has a circular columnar shape with a smaller diameter than the large-diameter portion 56. The to-be-broken portion 58 is constricted with a smaller diameter than the core rod portion 57. The operating rod portion 59 has a circular columnar shape having the same diameter as the core rod portion 57 and extending to the outside of the undeformed rivet body 51.

Herein, the gasket 70 separately prepared is placed on the circumferential outer surface 13c of the case lid member 12 (see FIG. 5).

In an insertion step, the cylindrical portion 53 of the undeformed blind rivet 50 is inserted in the through hole 12H of the case lid member 12 until the outer flange 52 comes into contact with the gasket 70 placed on the circumferential outer surface 13c of the case lid member 12 (see FIG. 4).

In a subsequent sealing step, while the outer flange 52 of the undeformed rivet body 51 of the undeformed blind rivet 50 inserted in the through hole 12H is pressed against the outer surface 13 of the case lid member 12, the operating rod portion 59 of the shaft part 55 is pulled up toward the proximal end side HK (the upper side UW in FIG. 4). Then, the large-diameter portion 56 of the shaft part 55 comes into engagement with the shoulder 53d formed in the cylindrical portion 53 of the undeformed rivet body 51. As the operating rod portion 59 is further pulled upward, a portion of the cylindrical portion 53 located on the proximal end side HK more than the shoulder 53d and on the distal end side HS more than the through hole 12H is buckled and plastically deformed so as to be widened outward in the radial direction and to press against the circumferential inner surface 14c of the inner surface 14 of the case lid member 12. Accordingly, the cylindrical portion 53 is deformed into the cylindrical shaft portion 63 inserted in the through hole 12H and the deformed caulking portion 64 continuous to the shaft portion 63 on the distal end side HS, so that the caulking portion 64 is made larger in diameter than the shaft portion 63 and engaged in close contact with the circumferential inner surface 14c of the case lid member 12. Simultaneously, this deformed caulking portion 64 caulks the circumferential inner surface 14c of the inner surface 14 of the case lid member 12, corresponding to the peripheral edge of the through hole 12H. On the other hand, the outer flange 52 caulks, without being deformed, the circumferential outer surface 13c of the outer surface 13 of the case lid member 12, corresponding to the peripheral edge of the through hole 12H, through the gasket 70. Thus, the undeformed rivet body 51 is transformed into the deformed rivet body 61 including the outer flange 52, the shaft portion 63, and the deformed caulking portion 64. Successively, the operating rod portion 59 is further pulled upward and then the shaft part 55 is broken at the to-be-broken portion 58. In this way, only the broken shaft part 65 consisting of the large-diameter portion 56 and the core rod portion 57 is left in the deformed rivet body 61 (the operating rod portion 59 is removed). The undeformed blind rivet 50 is accordingly transformed into the deformed blind rivet 60 including the deformed rivet body 61 and the broken shaft part 65 as shown in FIG. 3 and also the through hole 12H is hermetically sealed.

Thereafter, the inside of the vacuum chamber is returned to atmospheric pressure and then the battery 1 completely sealed is taken out of the vacuum chamber. The inside of the battery case 10 of the battery 1 is thus sealed in a reduced pressure state than atmospheric pressure.

Meanwhile, as mentioned above, the case lid member 12 is configured such that the circumferential outer surface 13c is located more outward in the axial outward direction HO than the peripheral edge portion 12r and the opening end portion 11f while the peripheral edge portion 12r of the case lid member 12 is joined (welded) to the opening end portion 11f of the case body member 11. Furthermore, the case body member 11 and the case lid member 12 of the battery case 10 and the outer flange 52 of the rivet 60 are configured so that the outer-surface-side edge 70rb and the outer-flange-side edge 70ra can be visually identified when seen from the first position P1 and the second position P2 on the radial outside RO of the axis line AX of the through hole 12H more than the battery case 10 toward the radial inside RI of the axis line AX (see FIG. 2). In the producing method of the battery 1 in the first embodiment, therefore, there are provided a step of determining the thickness of the gasket 70 while the through hole 12H is sealed by the rivet 60 and a selecting step of selecting a battery(s) with the determined thickness of the gasket within a predetermined range.

Figure 6:
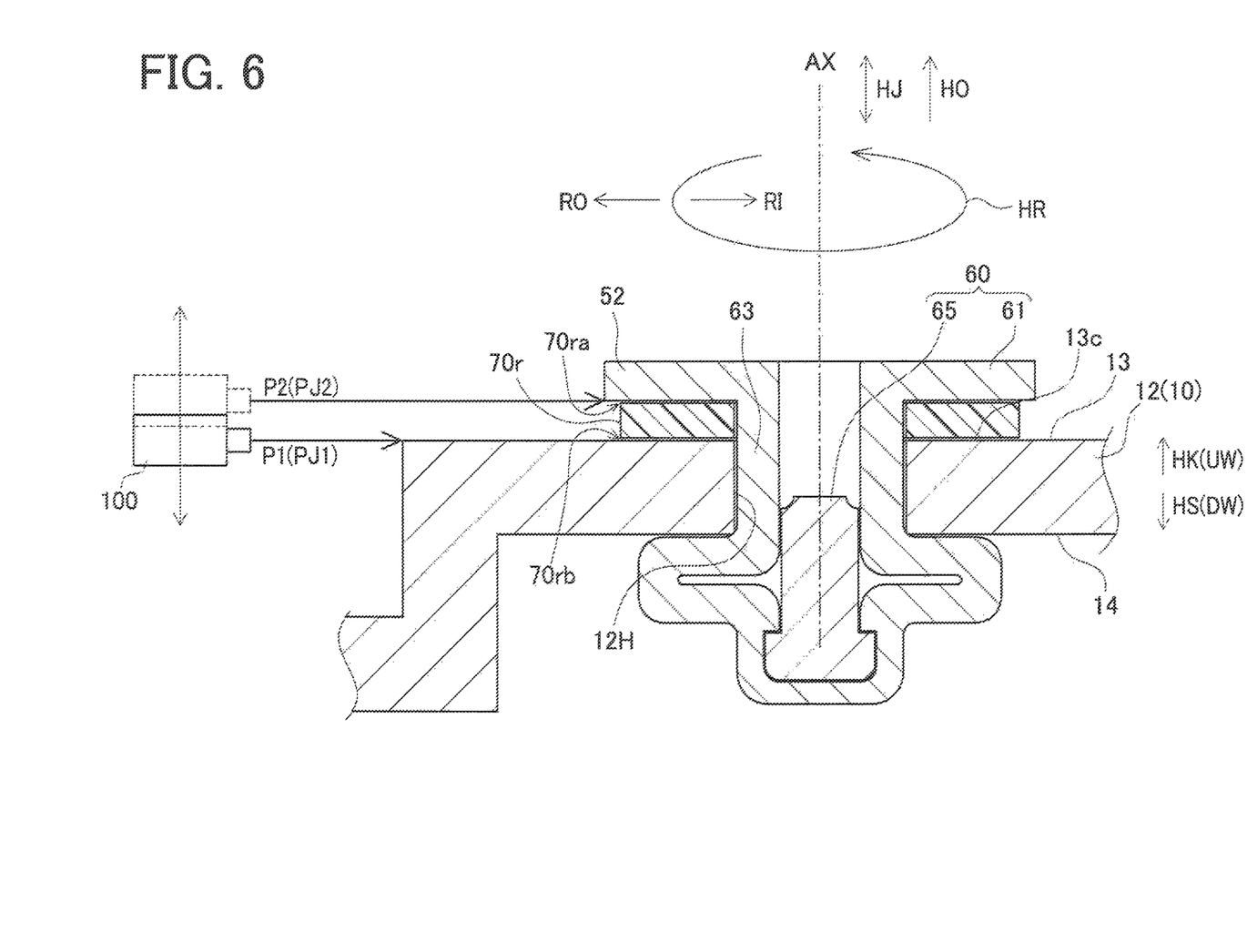
FIG. 6 is an explanatory view showing a method for measuring thickness of a gasket using a laser displacement sensor in the first embodiment.
Figure 7:
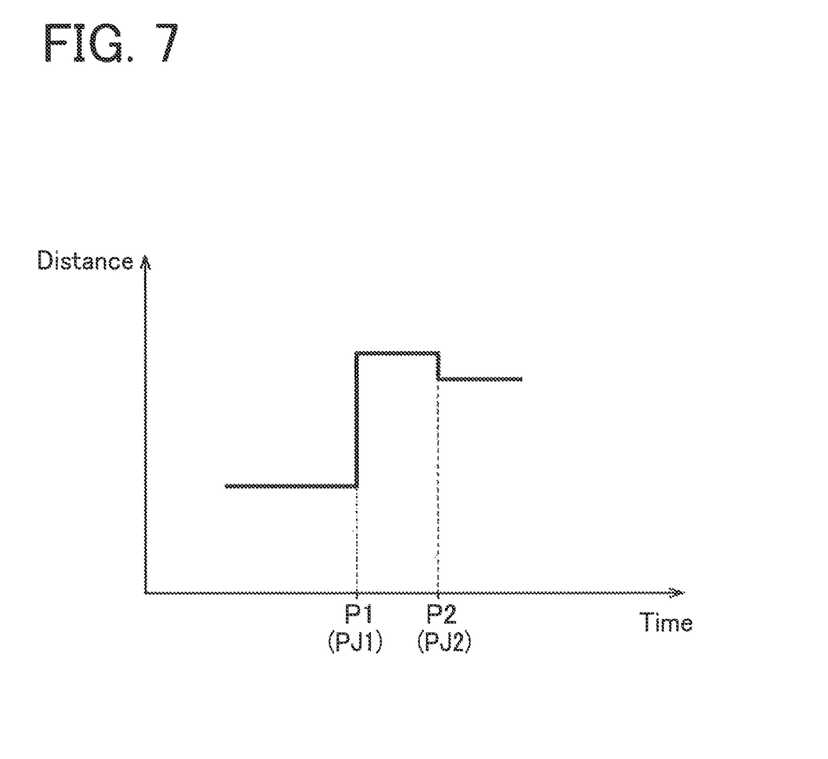
FIG. 7 is a distance profile obtained by use of the laser displacement sensor in the first embodiment.

In the first embodiment, as shown in FIG. 6, the thickness of the gasket is measured by a laser displacement sensor 100 (LJ-G030 by Keyence Co., Ltd.). To be concrete, the laser displacement sensor 100 is set in a position on the radial outside RO of the axis line AX more than the battery case 10 and in the circumferential direction HR (the left direction in FIG. 6 in the first embodiment) of the axis line AX at which the outer-surface-side edge 70rb and the outer-flange-side edge 70ra are visually identified to aim at the radial inside RI of the axis line AX. This laser displacement sensor 100 is configured to be movable in the axial direction HJ while keeping its orientation. By moving the laser displacement sensor 100 with constant speed in the axial direction HJ, the distances to the battery case 10 (the case lid member 12), the outer peripheral surface 70r of the gasket 70, and the outer flange 52 of the rivet 60 are continuously measured and recorded as measured distance data (distance profile) per moving time. FIG. 7 shows the distance profile in the first embodiment. In FIG. 7, the lateral axis represents the moving time of the laser displacement sensor 100 and the vertical axis represents the distance from the laser displacement sensor to a subject to be measured. Since the laser displacement sensor 100 is moved at constant speed in the axial direction HJ, the moving time in the lateral axis corresponds to the moving distance (position) of the laser displacement sensor 100 in the axial direction HJ. From changes in the distance profile, it is possible to detect the time at which the laser displacement sensor 100 passes through the first position P1 corresponding to the outer-surface-side edge 70rb and the second position P2 corresponding to the outer-flange-side edge 70ra respectively, that is, a position PJ1 in the axial direction HJ of the first position P1 and a position PJ2 in the axial direction HJ of the second position P2. Consequently, the distance in the axial direction HJ between the position PJ1 in the axial direction HJ of the first position P1 and the position PJ2 in the axial direction HJ of the second position P2 is determined by calculation and obtained as the thickness T of the gasket 70.

It is then determined whether or not this obtained thickness T of the gasket 70 is in a predetermined range to eliminate the battery or batteries with the gasket thickness falling outside the predetermined range. Thus, the battery or batteries with the gasket thickness falling in the predetermined range are selected.

In the first embodiment, the thickness T of the gasket 70 is measured by the laser displacement sensor. As an alternative, a camera may be used instead to photograph the gasket 70 so that the outer-surface-side edge 70rb and the outer-flange-side edge 70ra are positioned in respective predetermined positions on a photographed image, and the thickness T of the gasket 70 is calculated from the moving distance of the camera in the axial direction HJ at that time.

In a conditioning step (an initial charge and discharge step), subsequently, this battery 1 is subjected to initial charge and discharge. In this way, the battery 1 is completed.

As explained above, in the battery 1 of the first embodiment, the case lid member 12 is configured such that the circumferential outer surface 13c is located more outward in the axial outward direction HO than the peripheral edge portion 12r of the case lid member 12 and the opening end portion 11f while the peripheral edge portion 12r is joined to the opening end portion 11f of the case body member 11. Since this battery 1 is configured as above, the condition of the gasket 70 sealing the through hole 12H can be grasped or checked from the outside of the battery case 10 without being interrupted by the peripheral edge portion 12r of the case lid member 12 and the opening end portion 11f of the case body member 11.

In this battery 1, furthermore, the case body member 11 and the case lid member 12 of the battery case 10 and the outer flange 52 of the rivet 60 are configured to allow visual identification of the outer-surface-side edge 70rb and the outer-flange-side edge 70ra when the battery case 10 is observed from the first position P1 and the second position P2 on the radial outside RO of the axis line AX more than the battery case 10 toward the radial inside RI of the axis line AX. The thus configured battery 1 enables appropriate detection of the positions of the outer-surface-side edge 70rb and the outer-flange-side edge 70ra in the axial direction HJ or a positional relationship therebetween without being influenced for example by the presence of the opening end portion 11f of the case body member 11, a raised or bulged molten portion (the joining portion 11J) in the joining portions of the case body member 11 and the case lid member 12. Accordingly, the thickness of the gasket 70 while the through hole 12H is sealed by the rivet 60, that is, the compressed state of the gasket 70, can be easily checked. Thus, the battery 1 enabling easy checking the adequacy of sealing using the rivet 60 and the gasket 70 can be provided.

Meanwhile, the circumferential outer surface 13c or the contact portion 52ct of the flange internal surface 52c may be provided with a protrusion or a recess. However, it is difficult to strictly define the height of the protrusion or the recess (i.e., to extremely reduce a size tolerance). Even if the thickness of the gasket 70 at the outer peripheral surface 70r is set to an appropriate value, it is difficult to correctly define the thickness of a portion formed with the protrusion or recess. This configuration is apt to cause variations in sealing performance between batteries. In this battery 1, on the other hand, the circumferential outer surface 13c of the case lid member 12 and the flange internal surface 52c of the rivet 60 (at least the contact portion 52ct of the flange internal surface 52c contacting with the gasket 70) are flat surfaces perpendicular to the axis line AX. Accordingly, when the outer-flange-side edge 70ra and the outer-surface-side edge 70rb are visually observed from at least any position on the radial outside RO of the axis line AX more than the battery case 10 and in the circumferential direction HR of the axis line AX, the thickness and the shape of the whole gasket 70 can be detected. In addition, the sealing performance of the gasket 70 is less likely to vary between batteries.

In this battery 1, furthermore, the outer flange 52 of the rivet 60 is configured to have a portion positioned on the radial outside RO more than the outer-flange-side edge 70ra of the gasket 70, this portion being located more outward in the axial outward direction HO than the outer-flange-side edge 70ra over the entire circumference (i.e., the flange internal surface 52c is entirely a flat surface). Accordingly, the rivet 60 can be engaged in the through hole 12H without considering the placement of the rivet 60 in the circumferential direction HR of the axis line AX. This can achieve high degree of flexibility in placement of the rivet 60 in the circumferential direction HR of the axis line AX and enables reliable visual identification of the outer-flange-side edge 70ra from the radial outside RO.

Second Embodiment

A second embodiment will be explained below. A hybrid car (vehicle) 700 (hereinafter, also simply referred to as a car 700) in the second embodiment mounts therein the battery(s) 1 of the first embodiment to use electric energy stored in this battery(s) 1 as all or part of the drive energy of a drive source (see FIG. 8).

Figure 8:
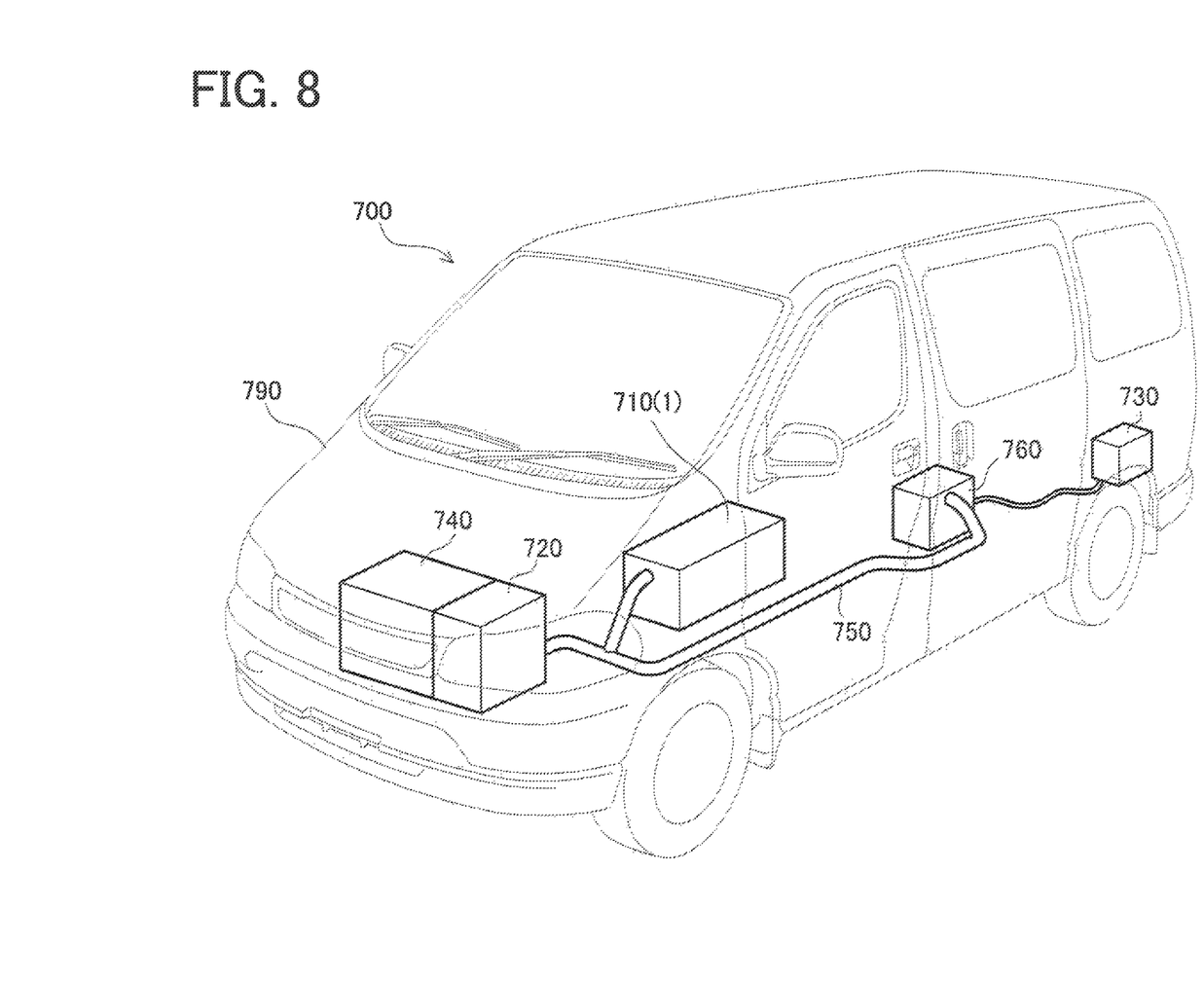
FIG. 8 is an explanatory view showing a hybrid vehicle in a second embodiment.

This car 700 is a hybrid car that mounts therein a battery pack 710 including a plurality of the batteries 1 assembled together and that is driven by using an engine 740, a front motor 720, and a rear motor 730 in combination. To be concrete, this car 700 mounts, in its car body 790, the engine 740, the front motor 720 and the rear motor 730, the battery pack 710 (the batteries 1), a cable 750, and an inverter 760. This car 700 is configured to drive the front motor 720 and the rear motor 730 by using the electric energy stored in the battery pack 710 (the batteries 1).

As mentioned above, the battery 1 with the gasket 70 of which thickness has been measured and its good hermeticity has been confirmed can enhance reliability of the car 700 mounting this battery 1.

Third Embodiment

Figure 9:
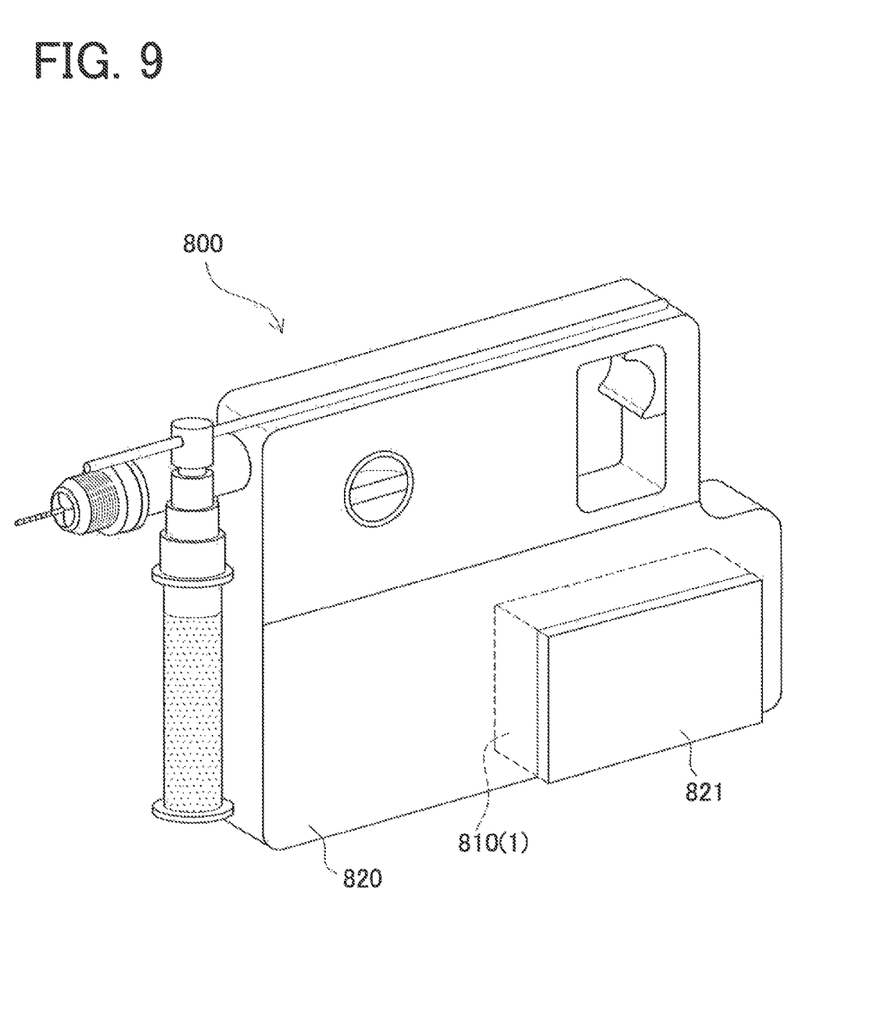
FIG. 9 is an explanatory view showing a hammer drill in a third embodiment.

A third embodiment will be explained below. A hammer drill 800 in the third embodiment is a battery-mounting device that mounts therein the battery(s) 1 of the first embodiment (see FIG. 9). This hammer drill 800 is configured such that a battery pack 810 (the batteries 1) including the batteries 1 is accommodated on a bottom 821 of a main body 820. This battery pack 810 is utilized as an energy source to drive the drill.

As explained above, the battery 1 with the gasket 70 of which the thickness has been measured and its good hermeticity has been confirmed can enhance reliability of the hammer drill 800 mounting this battery 1.

In the above explanation, the invention is described in the embodiments but is not limited to the above first to third embodiments. The present invention may be embodied in other specific forms without departing from the essential characteristics thereof.

For instance, the first embodiment shows the example that the through hole 12H is used as a liquid injection port to inject the electrolyte 17, but is not limited thereto. The through hole may include a vent hole to release gas generated in the battery case during production (such as initial charge and discharge) to the outside.

In the first embodiment, the case lid member 12 is configured such that the circumferential outer surface 13c formed with the through hole 12H protrudes in a circular cylindrical shape from the peripheral edge portion 12r of the case lid member 12 in the axial outward direction HO. However, the case lid member 12 has only to be configured such that the circumferential outer surface 13c is located more outward in the axial outward direction HO than the peripheral edge portion 12r of the case lid member 12 and the opening end portion 11f of the case body member 11, and is not limited thereto. For instance, the case lid member 12 may be configured to have a cone shape having a slope (a conical surface) from the peripheral edge portion 12r of the case lid member 12 toward the circumferential outer surface 13c to bulge in the axial outward direction HO.

In the second embodiment, the vehicle mounting the battery 1 according to the invention is exemplified by the hybrid car 700, but it is not limited thereto. The vehicle mounting the battery according to the invention may include electric cars, plug-in hybrid cars, hybrid railway vehicles, fork lifts, electric wheelchairs, electric bicycles, and electric scooters.

In the third embodiment, the battery mounting device that mounts the battery 1 according to the invention is exemplified by the hammer drill 800, but it is not limited thereto. The battery mounting device that mounts the battery according to the invention may include various battery-powered domestic and office appliances and industrial equipment, such as personal computers, mobile phones, battery-powered electric tools, and uninterruptible power supplies.

REFERENCE SIGNS LIST

1 Lithium ion secondary battery (Sealed battery)
10 Battery case
11 Case body member
11H Opening
11f Opening end portion
11J Joining portion
12 Case lid member
12r Peripheral edge portion (of Case lid member)
13 Outer surface (of Case lid member)
14 Inner surface (of Case lid member)
12H Through hole (Liquid supply port)
13c Circumferential outer surface
14c Circumferential inner surface
15 Safety valve
20 Electrode body
40 Positive terminal
41 Negative terminal
50 Undeformed blind rivet
51 Undeformed rivet body
52 Outer flange
52c Flange internal surface
52ct Contact portion (of Flange internal surface)
53 Cylindrical portion (Bottom-closed cylindrical portion)
60 Deformed blind rivet (Rivet)
61 Deformed rivet body
63 Shaft portion
64 Deformed caulking portion
70 Gasket
70r Outer peripheral surface (of Gasket)
70ra Outer-flange-side edge
70rb Outer-surface-side edge
100 Laser displacement sensor (Laser macrometer)
T Thickness (of Gasket)
AX Axis line (of Through hole)
HJ Axial direction
HO Axial outward direction
RO Radial outside
RI Radial inside
P1 First position
P2 Second position
PJ1 Position in axial direction of first position
PJ2 Position in axial direction of second position

The invention claimed is:

1. A battery including:
a battery case having:
  a case body member including an opening and an opening end portion defining this opening; and
  a case lid member having a through hole formed through the case lid member and a peripheral edge portion joined to the opening end portion of the case body member to seal the opening;
a rivet engaged in the through hole, the rivet including:
  a shaft portion inserted in the through hole; and
  an outer flange continuous to the shaft portion on outside of the battery case, the outer flange being larger in diameter than the shaft portion; and
a gasket made in an annular form and of thermoplastic resin or rubber elastic material,
the gasket being interposed between and in close contact with a circumferential outer surface of an outer surface of the case lid member facing to the outside of the battery case, the circumferential outer surface being located around a peripheral edge of the through hole, and the outer flange of the rivet, to hermetically seal the through hole, the circumferential outer surface having a larger diameter than an outer diameter of the gasket,
wherein the case lid member is configured such that
the entire circumferential outer surface being in contact with the gasket is a uniform flat surface perpendicular to an axis line of the through hole and protrudes more outward than the peripheral edge portion in an axial outward direction facing outside along the axis line of the through hole, and the circumferential outer surface is positioned more outward in the axial outward direction facing outside along the axis line of the through hole than the peripheral edge portion and the opening end portion while the peripheral edge portion of the case lid member is joined to the opening end portion of the case body member, and
the case lid member comprises a stepped wall portion extending along the axis line between the peripheral edge portion and the circumferential outer surface so as to form a space between interior surfaces of the stepped wall portion, and
wherein a flange internal surface of the outer flange of the rivet facing the circumferential outer surface includes a contact portion contacting with the gasket, and
at least the contact portion of the flange internal surface is a flat surface perpendicular to the axis line.

2. The battery according to claim 1, wherein
assuming that a first position is a position at which an outer-surface-side edge which is an edge contacting with the circumferential outer surface of an outer peripheral surface of the gasket interposed between the circumferential outer surface and the outer flange is visually identifiable when the battery case is observed from a radial outside of the axis line more than the battery case toward a radial inside of the axis line, and
assuming that a second position is a position at which an outer-flange-side edge which is an edge contacting with the outer flange of the outer peripheral surface of the gasket interposed between the circumferential outer surface and the outer flange is visually identifiable when the battery case is observed from a position on the radial outside of the axis line more than the battery case and at the same angle position in a circumferential direction of the axis line as the first position and more outward in the axial outward direction than the first position toward the radial inside of the axis line,
the case body member and the case lid member of the battery case and the outer flange of the rivet are configured such that the first position and the second position are present.

3. The battery according to claim 2, wherein the outer flange of the rivet is configured to include a portion on a radial outside more than the outer-flange-side edge of the gasket so that the portion is positioned more outward in the axial outward direction than the outer-flange-side edge over an entire circumference.

4. The battery according to claim 1, wherein the outer flange of the rivet is configured to include a portion on a radial outside more than the outer-flange-side edge of the gasket so that the portion is positioned more outward in the axial outward direction than the outer-flange-side edge over an entire circumference.

5. The battery according to claim 1, wherein the battery case is configured such that the case lid member is inserted in the opening of the case body member.

* * * * *